L. W. HEIDEN.
GRAIN HANDLING DEVICE.
APPLICATION FILED APR. 15, 1916.
1,225,031.
Patented May 8, 1917.
2 SHEETS—SHEET 1.
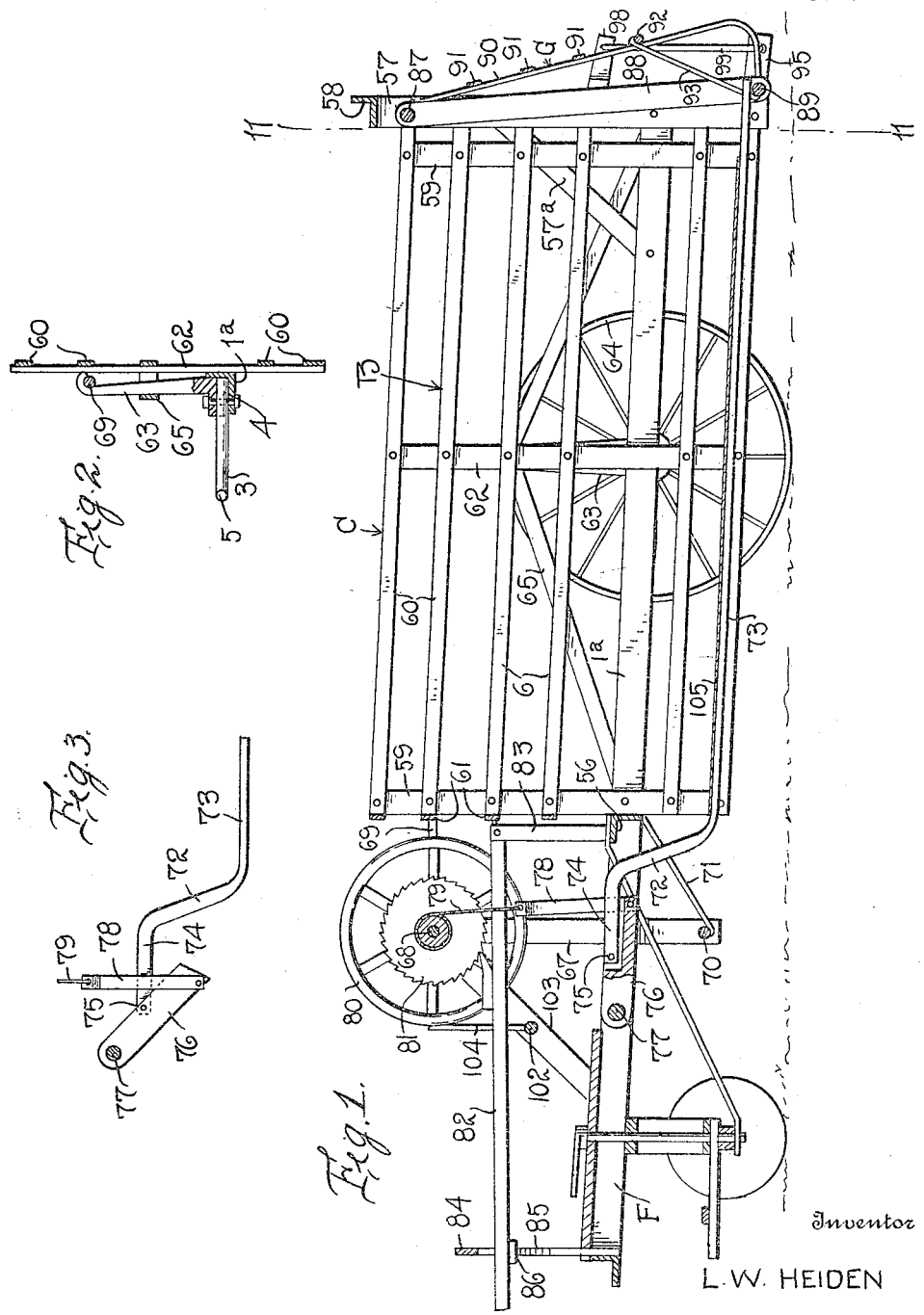
Inventor
L. W. HEIDEN
By Watson E. Coleman
Attorney L. W. HEIDEN.
GRAIN HANDLING DEVICE.
APPLICATION FILED APR. 15, 1916.
1,225,031.
Patented May 8, 1917.
2 SHEETS—SHEET 2.
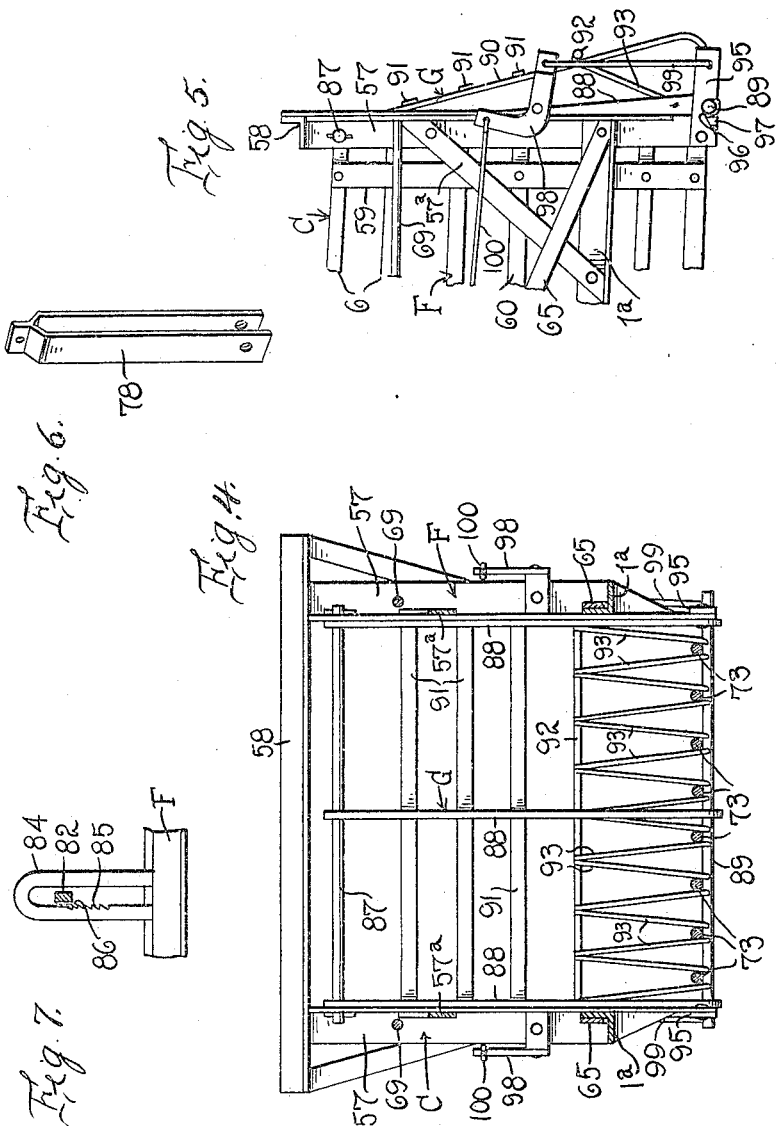
Inventor
L. W. HEIDEN
By Watson E. Coleman
Attorney

UNITED STATES PATENT OFFICE.

LOUIS W. HEIDEN, OF ARTHUR, NORTH DAKOTA.

GRAIN-HANDLING DEVICE.

1,225,031.   Specification of Letters Patent.   Patented May 8, 1917.

Application filed April 15, 1916. Serial No. 91,418.

*To all whom it may concern:*

Be it known that I, LOUIS W. HEIDEN, a citizen of the United States, residing at Arthur, in the county of Cass and State of North Dakota, have invented certain new and useful Improvements in Grain-Handling Devices, of which the following is a specification, reference being had to the accompanying drawings.

This invention relates to certain improvements in grain handling devices and it is an object of the invention to provide an apparatus of this general character comprising a novel and improved carrier from which the collected sheaves or bundles may be discharged when the requirements of practice may so require.

The invention also has for an object to provide a device of this general character including a novel and improved carrier wherein the bottom of said carrier comprises a plurality of vertically movable members or tines together with means coacting with the members or tines whereby the same may be elevated out of contact with the ground during the period the sheaves or bundles are being collected and whereby said members or tines may be dropped upon the ground when it is desired to discharge the sheaves or bundles collected.

Furthermore it is an object of the invention to provide an apparatus of this general character including a novel and improved carrier having a swinging end gate which serves as a support for maintaining the members or tines in their elevated position, together with means for locking the end gate in closed position, said locking means also serving as a medium to prevent the end gate from interfering with the tines or members when said end gate is released.

The invention consists in the details of construction and in the combination and arrangement of the several parts of my improved handling device whereby certain important advantages are attained and the device is rendered simpler, less expensive and otherwise more convenient and advantageous for use, all as will be hereinafter more fully set forth.

The novel features of the invention will hereinafter be definitely claimed.

In order that my invention may be the better understood, I will now proceed to describe the same with reference to the accompanying drawings, wherein—

Figure 1 is a longitudinal vertical sectional view taken through a carrier constructed in accordance with an embodiment of my invention;

Fig. 2 is a fragmentary view partly in elevation and partly in section illustrating certain details of the carrier and especially as relates to the mounting of a trunnion;

Fig. 3 is a fragmentary view partly in elevation and partly in section illustrating the mounting of one of the elongated bars or tines as herein employed;

Fig. 4 is a sectional view taken substantially on the line 11—11 of Fig. 1;

Fig. 5 is a fragmentary elevational view of the rear end of the carrier as herein set forth;

Fig. 6 is a view in perspective of one of the clevises, detached, as herein disclosed; and Fig. 7 is a view partly in elevation and partly in section illustrating the locking means for the lever coacting with the ratchet for controlling the movement of the tines or bars.

As herein embodied, the frame F of the carrier C comprises the parallel side beams $1^a$ tied or connected adjacent their forward ends by the transverse beam 56, and secured to the rear ends of the beams $1^a$ are the uprights 57 having their upper ends connected by the transverse beam 58 and having their lower end portions extending a predetermined distance below the beams $1^a$ and terminating in close proximity to the surface over which the device is adapted to be drawn. The beams $1^a$ have also secured thereto at points in close proximity to the transverse beam 56 and the rear uprights 57, the upstanding posts 59 of a height substantially equal to the height of the uprights 57, and the longitudinally alined posts 59 have secured thereto the bars 60 while the inner transversely alined uprights 59 are connected by the transverse bars 61 whereby a basket B is afforded and into which the bundles or sheaves are adapted to be discharged from the platform P. I also find it of especial advantage to interpose between the frame $1^a$ and the uprights 57, the brace bar $57^a$ whereby additional rigidity is afforded said uprights 57.

The beams 1ª are also provided at points substantially midway between the upstanding uprights 59 with the additional uprights 62 to which the bars 60 are also connected, and secured to the outer face of each of the additional uprights 62 is a bearing iron 63 to afford additional strength to the mounting of the laterally directed stub shaft 4 and upon which is rotatably mounted a supporting wheel 64.

Coacting with each of the bearing irons 63 and the adjacent beam 1ª is the brace member 65 substantially in the form of an inverted U, although it is to be understood that if desired said brace member may be comprised of two sections.

At a predetermined point in advance of the forward posts 59 the beams 1ª are provided with the posts 67 which extend a predetermined distance above and below the beams 1ª and the upper ends of said posts 67 have rotatably engaged therewith the shaft 68, and interposed between the extremities of said shaft 68 and the uprights 57 and extending longitudinally of the beams 1ª, are the truss rods 69, said rods also passing between the additional uprights or posts 62 and the bearing irons 63 coacting therewith, said rods 69 being suitably anchored to the upper end portions of the bearing irons 63, whereby it will be perceived that the carrier as a whole will possess a maximum of strength.

The lower ends of the posts 67 are tied or connected by the bar 70 disposed transversely of the frame F at a point below the beams 1ª and interposed between said rod 70 and the transverse beam 56 are the pairs of parallel rods 71 between each pair of which is loosely directed the upwardly extending flattened portion 72 of the bottom bars or tines 73. The upwardly extending portions 72 are continued in the forwardly directed portion 74 and occupy a plane substantially parallel to the planes of the tines or bars 73, and said portions 74 are pivotally connected, as at 75, at points intermediate the length of the rock arms 76 loosely mounted upon the stationary shaft 77 disposed transversely of the frame F and fixed to the side beams 1ª at a point in advance of the posts 67. The lower or free end of each of the rock arms 76 has pivotally engaged therewith the clevis 78 having connected thereto a flexible member 79 which is adapted to be wound about the shaft 68 when it is desired to elevate the bars or tines 73.

While any means may be employed for imparting the requisite axial rotation to the shaft 68, I provide, in the present embodiment of my invention, the shaft 68 with the operating wheel 80 provided with the ratchet wheel 81 with which coacts the lever 82 having one end pivotally engaged with the upstanding pedestal 83 carried by the transverse beam 56, while the opposite or free end portion of the lever 82 is loosely directed through the inverted U member 84 positioned at the forward end of the frame F and having an inner longitudinal edge provided with the rack 85 adapted to have engaged therewith the spring catch 86 carried by the lever 82, whereby it will be perceived that when desired the shaft 68 may be effectively held against retrograde movement in order that the tines or bars 73 may be maintained in their elevated or operative positions. It will be understood that upon release of the shaft 68, the bars or tines 73 are adapted to drop by gravity.

The upper end portions of the uprights 57 at a point below but in close proximity to the transverse beam 58, rotatably support the shaft 87 included in the end gate G which is adapted to swing in a vertical plane and which assumes its closed position by gravity.

As herein disclosed, the end gate G includes the arms 88 depending from and secured to the shaft 87 and having their lower ends connected by the transverse rod 89. The upper end portions of the arms 88 have secured thereto the extremities of the rods 90 which have their major portions straight and in diverging relation to the arms 88 and having their lower end portions disposed inwardly on a predetermined curvature and secured to the lower ends of the arms 88. The straight portions of the rods 90 have secured thereto the transversely disposed bars 91 while said bars 90 at a point in close proximity to the curved portion thereof have secured thereto the rod 92, and said rod 92 and the rod 89 have interposed therebetween the pairs of guide members 93, the members of each pair being arranged upwardly in predetermined divergence.

The bars or tines 73 are of such a length as to have their rear or free ends rested upon and supported by the rod 89, each of said bars or tines 73 being insertible between a pair of guide members 93. It is to be understood that the bars or tines 73 engage the rod 89 when the end gate G is in closed position and it will also be understood that the tines or bars 73 are adapted to be reset or elevated with the end gate G in an open or partially open position so that when the end gate G is closed and the shaft 68 released, the bars or tines will automatically enter between the pairs of guide members 93.

Pivotally connected with the lower ends of each of the uprights 57 is a rearwardly directed latch member 95 adapted to overlie an end portion of the rod 89 and provided in its under margin with the recess 96, whereby the end gate G is effectively maintained in its closed position. The latch member 95 is prevented from dropping beyond substantially the horizontal, when the gate G is in open position, by a stop 97 and the latch 95 is of such a length as to prevent the end gate G from dropping to a closed position so that no obstruction will be offered to the elevation of the tines or bars 73. After the tines or bars 73 have been properly elevated, the latches 95 are then elevated whereupon the gate G drops to its closed position and the rod 89 is engaged with the latches 95 for holding the end gate in its closed adjustment.

As herein embodied, each of the uprights 57 has pivotally engaged therewith at a predetermined point above the beams 1ª, a bell lever 98, one arm of which is operatively engaged, as at 99, with the latch 95, while the second arm of the bell lever 98 has operatively engaged therewith the rod 100 which extends forwardly of the frame F and is operatively connected with the transverse rock shaft 102 rotatably supported by the brace members 103 interposed between the posts 67 and the beams 1ª at a predetermined point in advance of said posts 67. The shaft 102 is provided with an upstanding operating lever 104 whereby it will be perceived that the latches 95 may be conveniently operated in accordance with the necessities of practice.

I also find it of advantage to position upon the major portions of the tines or bars 73 the flexible apron 105 having its corners secured to the outermost of said bars or tines. This apron 105 serves to prevent the dropping between the bars or tines 73 of grain which may become separated from the sheaves or bundles deposited upon the basket B.

From the foregoing description, it is thought to be obvious that a handling device constructed in accordance with my invention is of an extremely simple and comparatively inexpensive nature and is particularly well adapted for use by reason of the convenience and facility with which it may be assembled, and it will also be obvious that my invention is susceptible of some change and modification without material departure from the principles and spirit thereof and for this reason I do not wish to be understood as limiting myself to the precise arrangement and formation of the several parts herein shown in carrying out my invention in practice.

I claim:

1. A carrier including a portable frame, a basket having an end open, a gate for said open end, a plurality of endwise movable bars constituting the bottom of the basket, and means for elevating the bars.

2. A carrier including a portable frame, a basket having an end open, a gate for said open end, a plurality of endwise movable bars constituting the bottom of the basket, and means for elevating the bars, the end gate when in closed position affording a support for the bars.

3. A carrier including a portable frame, a basket having an end open, a gate for said open end, a plurality of endwise movable bars constituting the bottom of the basket, means for elevating the bars, the end gate when in closed position affording a support for the bars, and means for holding the gate in closed position, said means also serving to prevent the gate from returning to closed position.

4. A carrier comprising a portable frame, a basket carried by the frame, a plurality of rock arms supported by the frame adjacent an end of the basket, bars constituting the bottom of the basket and having end portions pivotally secured to the rock arms intermediate the length of the rock arms, and means coacting with the lower extremities of the rock arms for elevating said rock arms and the bars.

5. A carrier comprising a portable frame, a basket carried by the frame, a plurality of rock arms supported by the frame adjacent an end of the basket, bars constituting the bottom of the basket and having end portions pivotally secured to the rock arms intermediate the length of the rock arms, means coacting with the lower extremities of the rock arms for elevating said rock arms and the bars, and a gate coacting with the basket, said gate when closed affording a support for the end portions of the bars remote from the rock arms.

6. A carrier comprising a portable frame, a basket carried by the frame, a plurality of rock arms supported by the frame adjacent an end of the basket, bars constituting the bottom of the basket and having end portions pivotally secured to the rock arms intermediate the length of the rock arms, means coacting with the lower extremities of the rock arms for elevating said rock arms and the bars, and a gate coacting with the basket, said gate when closed affording a support for the end portions of the bars remote from the rock arms, said gate being provided with guiding means coacting with the bars.

In testimony whereof I hereunto affix my signature in the presence of two witnesses.

LOUIS W. HEIDEN.

Witnesses:
S. L. CROTHERS,
ROY EARD.